United States Patent [19]
Thompson

[11] Patent Number: 5,418,540
[45] Date of Patent: May 23, 1995

[54] METHOD AND APPARATUS FOR ELIMINATING SIGNAL SIDELOBES FROM A RECEIVED SIGNAL FRAME IN A MULTICHANNEL RECEIVER

[75] Inventor: James P. Thompson, Greenlawn, N.Y.

[73] Assignee: AIL Systems, Inc., Deer Park, N.Y.

[21] Appl. No.: 35,414

[22] Filed: Mar. 23, 1993

[51] Int. Cl.⁶ .......................... G01S 3/16; G01S 3/28
[52] U.S. Cl. ................................................... 342/379
[58] Field of Search .................................. 342/14, 379

[56] References Cited

U.S. PATENT DOCUMENTS 3,787,855  1/1974  Cragon et al. .
4,633,285  3/1986  Hunsinger et al. .
4,652,879  12/1987  Rudish et al. .

OTHER PUBLICATIONS

Andrew Laundrie, *ACT Technology Bestows Accelerated Signal Processing*, Microwave & RF, Aug. 1989.

Primary Examiner—Theodore M. Blum
Attorney, Agent, or Firm—Hoffmann & Baron

[57] ABSTRACT

A method and apparatus for use with a multichannel receiver to eliminate signal sidelobes within a received signal time frame is disclosed. The elimination of signal sidelobes within a channelized receiver is accomplished by using an analog preprocessor. The analog preprocessor is capable of producing an amplitude mask based upon the determination of the greatest amplitude and frequency channel in a two-dimensional receiver system or frequency channel and time slot in a three-dimensional receiver system signal. The amplitude mask covers a predefined space in time and frequency equal to or below the peak signal amplitude. A signal in the frequency/time cell space covered by the mask must have a magnitude exceeding the magnitude of the amplitude mask in order for the signal to pass through the analog preprocessor for further processing.

13 Claims, 6 Drawing Sheets

METHOD AND APPARATUS FOR ELIMINATING SIGNAL SIDELOBES FROM A RECEIVED SIGNAL FRAME IN A MULTICHANNEL RECEIVER

BACKGROUND OF THE INVENTION

1. Field of the Invention

The present invention relates to multichannel receivers, and, more particularly to multichannel receivers having an analog signal preprocessor which is capable of eliminating signal sidelobes from a received signal frame and a method for doing the same.

2. Description of the

Presently, the electromagnetic signal environment includes an increasing waveform complexity as well as increasing emitter density in both the frequency and time domains. As the emitter density and waveform complexity proliferate, the capabilities of conventional receivers are overwhelmed. It is not unusual for a signal environment to consist of tens of millions of pulses of radio-frequency (RF) data per second. This amount of data requiring processing exceeds the capabilities of present receivers and digital signal processors by a significant number of samples of data per second. These high data rates occur because in order to obtain high probability of intercept of some high priority signals which may have short on-times, present receivers must have high sensitivity and either constant monitoring of the frequencies of interest using many parallel receiver channels or a very wide instantaneous bandwidth scanning receiver which permits rapid revisit to the short on-time frequencies. In either case, the receiver is forced to collect very large amounts of data due to the large instantaneous RF bandwidth used. These complex receivers are generally large, costly, difficult to maintain and consume large amounts of power.

New receiver architectures have been developed specifically to address the dense emitter environment. These architectures include a channelized receiver, a microscan receiver and an acousto-optic (Bragg cell) receiver. Each of these receivers has the disadvantage of producing signal sidelobes associated with valid received signals in both the frequency and time domains. Generally, in these systems, the baseband response to an input signal consists of a train of pulses corresponding to antenna pattern mainlobe responses for a succession of scans. The baseband response during the interpulse periods may contain minor pulse responses, termed time sidelobe responses or ringing effect, which may be mistaken for mainlobe responses by the baseband processor. Additionally, channelized receivers can also produce sidelobe responses as a function of frequency. A channel several frequency channels away from the channel which receives the signal most strongly can also respond to the signal due to signal level of the edges of the channel passband.

Multichannel receivers frequently use analog filtering techniques to perform an initial sorting by frequency, but subsequent processing stages are often overwhelmed by the data flowing through the analog filter. In some instances, up to 200 frequency channels having better than a 10 nanosecond time resolution will be required. In spite of recent advances in digital processing, it remains impractical to digitize and process these large amounts of data due to the extensive amount of hardware needed. Accordingly, in order to digest and utilize the immense quantity of data being received, especially within the size, weight and power constraints of on-board systems, advanced analog preprocessors need to be developed. An advanced analog preprocessor preferably would make rapid decisions on the raw data and transmit only specifically selected information to the digital processing stages.

One form of a modern receiver architecture has been developed by AIL Systems, Inc. of Eaton Corporation, and is described in U.S. Pat. No. 4,652,879, by Rudish, et al , entitled, "Phased Array Antenna System To Produce Wide-Open Coverage Of A Wide Angular Sector With High Directive Gain And Strong Capability To Resolve Multiple Signals" issued Mar. 24, 1987 the disclosure of which is incorporated herein by reference. The Rudish, et al. patent discloses a phased array antenna system which is capable of scanning at very fast rates to prevent the loss of information during the scanning process. The phased array is configured to add the capability to provide multi-dimensional separation of multiple signals to enable measurement of direction of arrival and frequency, and to eliminate the sensitivity loss due to sampling usually encountered with rapid-scan systems.

The system utilizes a technique which processes segments of RF signals to simultaneously achieve frequency channelization and provide angle-of-arrival information as relative timing within a signal segment. This simultaneous frequency and time domain processing introduces ambiguity in the form of time and frequency domain sidelobes that can mask other valid signals within the signal segment. Generally, this system is a combined compressive and channelized receiver and thus produces signal sidelobes in both the frequency and time domains which are difficult to eliminate using conventional analog or digital devices. Accordingly, it would be advantageous to provide such a system with an advanced analog preprocessor having the capability of eliminating signal sidelobes and thus enabling the system to process all valid signals received.

OBJECTS AND SUMMARY OF THE INVENTION

It is an object of the present invention to provide a method and apparatus for eliminating signal sidelobes from a received signal frame in a multichannel receiver.

In accordance with one form of the present invention, the elimination of signal sidelobes from received signals in a multichannel receiver is accomplished through the use of an analog preprocessor. The analog preprocessor is responsive to output signals generated by the multichannel receiver and input into the analog preprocessor, and will provide a means for determining a peak magnitude valid signal from the received signals, the determining means generating an output signal in response to the peak signal and means for generating an amplitude mask in response to the output signal of the determining means. The received signals are responsive to the amplitude mask generating means and the amplitude mask attenuates the received signals having an amplitude which is below a predetermined level based upon the amplitude of the peak signal. Accordingly, signals which have an amplitude less than the amplitude of the amplitude mask are attenuated, i.e., eliminated, from the output of the preprocessor.

New components of the amplitude mask may be formed based upon subsequently determined peak signals and are combined with the existing amplitude mask or a new amplitude mask is formed based on the new information. Once again, as the amplitude mask evolves, (i.e., the mask changes in response to the determination of new peak signals), the signals which have a magnitude less than the amplitude mask are eliminated, leaving only valid peak signals being output from the preprocessor. These valid signals are permitted to pass through the analog preprocessor for further processing within the multichannel receiver. The elimination of signal sidelobes from the received signals in the multichannel receiver greatly reduces the burden of the processor within the multichannel receiver.

The amplitude mask generating means preferably includes a controller whose input is coupled to the peak signal determining means. The controller generates control signals in response to the determining means output signals corresponding to peak valid signals. A plurality of acoustic charged transport devices are coupled to the channels of the multichannel receiver and each of the acoustic charge transport devices includes a plurality of output taps having output signals generated thereon in response to the output signals generated by the multichannel receiver. A plurality of programmable attenuators are coupled to a respective tap for each of the plurality of output taps on the acoustic charge transport devices. Each programmable attenuator is responsive to the control signals generated by the controller in response to the peak signal determining means output signal. The controller provides control signals to each of the attenuators to adjust the attenuators in response to the peak signal determining means output signal, thereby generating the amplitude mask. Signals having an amplitude less than the predetermined level amplitude based upon the amplitude of the peak signal are attenuated out of the received signals being processed.

The peak signal determining means is preferably formed from a "greatest of" circuit which compares all of its inputs for each 8 nsec time period to determine the receiver channel having the greatest amplitude in each time period. The "greatest of" circuit outputs channel number identification, time slot identification and amplitude level for each time slot with a signal response and provides this information to the controller. The controller determines the time slot with the maximum amplitude for each 200 nsec time frame and uses the amplitude and channel number and time slot number address of the peak signal to adjust the attenuators and thereby position the amplitude mask. In this manner, the amplitude mask is positioned with respect to the position of detected peak signals until all valid signals are detected.

A method in accordance with the present invention for determining valid signals from received signals in a multichannel receiver which includes a plurality of channels on which are generated output signals is also described. The method includes using an analog preprocessor which is responsive to the output signals of the multichannel receiver to eliminate signal sidelobes from the received signals. The analog preprocessor performs the steps of determining a peak signal from the received signals, the peak signal being identified as a first valid signal, generating an amplitude mask from the first valid signal amplitude and address, and applying the amplitude mask to the received signals thereby eliminating signals having an amplitude less than the amplitude of the amplitude mask.

Furthermore, the analog preprocessor may perform the steps of determining a second peak signal from those signals having a magnitude greater than the amplitude of the amplitude mask applied in the previous step, generating a new component or new amplitude mask based upon the second peak signal amplitude and address (channel number and time slot number), and applying the amplitude mask to the remaining received signals to eliminate any remaining signal sidelobes. Thus, the amplitude mask evolves or moves with the identification of valid peak signals having an amplitude exceeding the mask until all valid signals are detected.

A preferred form of the analog preprocessor, as well as other embodiments, objects, features, and advantages of this invention, will be apparent from the following detailed description of illustrative embodiments thereof, which is to be read in conjunction with the accompanying drawings.

DETAILED DESCRIPTION OF THE PREFERRED EMBODIMENTS

An advanced multichannel receiver formed in accordance with the present invention is capable of processing RF signals to achieve frequency channelization. Preferably, the frequency bands are segmented into 10 MHz wide channels. Additionally, the multichannel receiver can preferably provide angle-of-arrival information as a relative timing within a predetermined time segment of a received signal frame.

Figure 1:
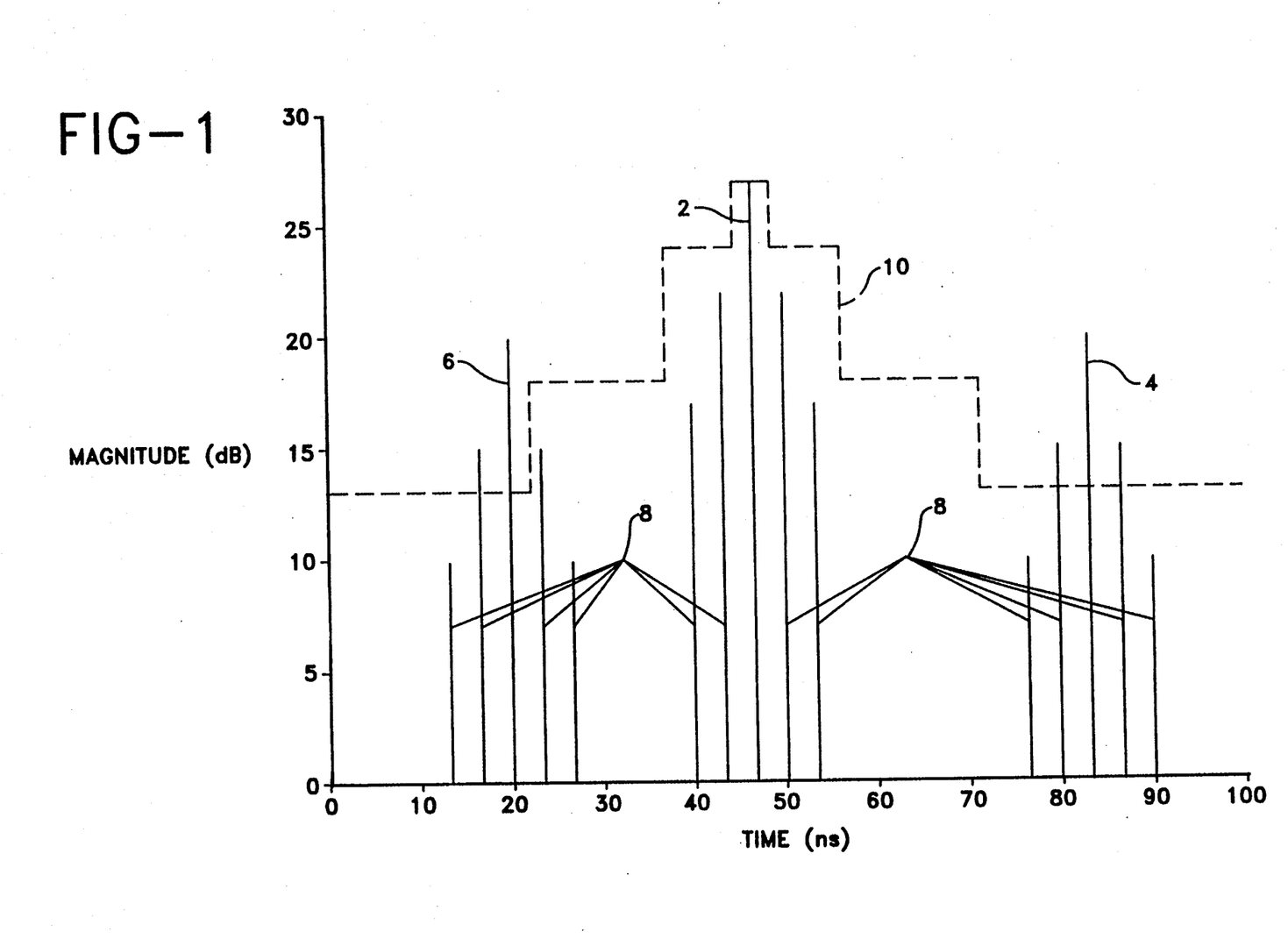
FIG. 1 is a graph of time versus magnitude illustrating three valid signals and associated sidelobes.

Referring to FIG. 1, there is illustrated a time versus magnitude graph showing three mainlobe signals 2, 4, 6 and representative partial sidelobes 8 shown in the time domain which indicate expected amplitude responses from one channel of an advanced multichannel receiver. Three signals are shown in the figure, although more may exist. Each signal 2, 4, 6 includes several other lower level sidelobe responses 8. These signals may also produce sidelobe responses in up to plus or minus fifteen adjacent frequency channels out of a total of up to 200 channels within the advanced multichannel receiver. A multichannel receiver having a preprocessor formed in accordance with the present invention is directed to eliminating sidelobe responses and detecting all mainlobe or valid signals that occur within a specified time period or signal frame, preferably a 200 nanosecond (nsec) period. The sidelobe elimination process preferably occurs every 100 nsec and covers a contiguous 200 nsec window. Thus, there is a 100 nsec overlap with the previous window.

A multichannel receiver having an advanced analog preprocessor formed in accordance with the present invention accomplishes elimination of the sidelobe responses by generating a predetermined amplitude mask 10, shown in FIG. 1, which covers a predefined space in time and frequency relative to a peak signal response in a signal frame or predefined time period as previously described. The amplitude mask 10 is formed having relative amplitude levels equal to or below the peak signal amplitude, such that a signal in a given frequency/time cell in the space covered by the mask must have an amplitude which exceeds the mask amplitude in order for the signal to pass through the preprocessor for further processing. The amplitude mask 10 is preferably applied sequentially to the additional surviving peak signals 4, 6 to eliminate sidelobes which may have passed through the initial amplitude mask. Thus, the mask evolves or moves with the detection of subsequent peak signals, i.e., valid signals until all valid signals are determined. The amplitude mask will be described in greater detail later in the description.

Several alternative methods are envisioned for applying the amplitude mask to the signal responses within an advanced multichannel receiver. One method includes the use of charge-coupled devices (CCD's). The preferred method of accomplishing elimination of signal sidelobes using an amplitude mask involves the use of acoustic charge transport (ACT) technology. Thus, the preferred embodiment of the present invention uses ACT devices and will be described in greater detail in the description; however, the scope of the disclosure is intended to include the implementation of the invention by any means which accomplishes a similar result.

An ACT device is a high speed monolithic gallium-arsenide (GaAs), charge transfer device which, in its most basic form, provides the fundamental function of radio-frequency (RF) signal delay. This is achieved through the conversion of an analog input signal voltage to discrete charge packets which are transported through a semiconductor channel at a fixed velocity and are subsequently sensed at one or more output detection points or taps. Charge packet transport is accomplished in a buried channel by a piezoelectrically induced traveling wave electric field of a single, ultra-high frequency (UHF) surface acoustic wave (SAW) which is generated directly in the GaAs buried channel. The propagating SAW functions as a built-in clock signal which results in a continuous charge transfer precisely at the characteristic SAW velocity which is approximately 2864 m/sec. A basic ACT device is described in U.S. Pat. No. 4,633,285 to Hunsinger, et al., issued Dec. 30, 1986, entitled, "Acoustic Charge Transport Device And Method" the disclosure of which is incorporated herein by reference.

Figure 2:
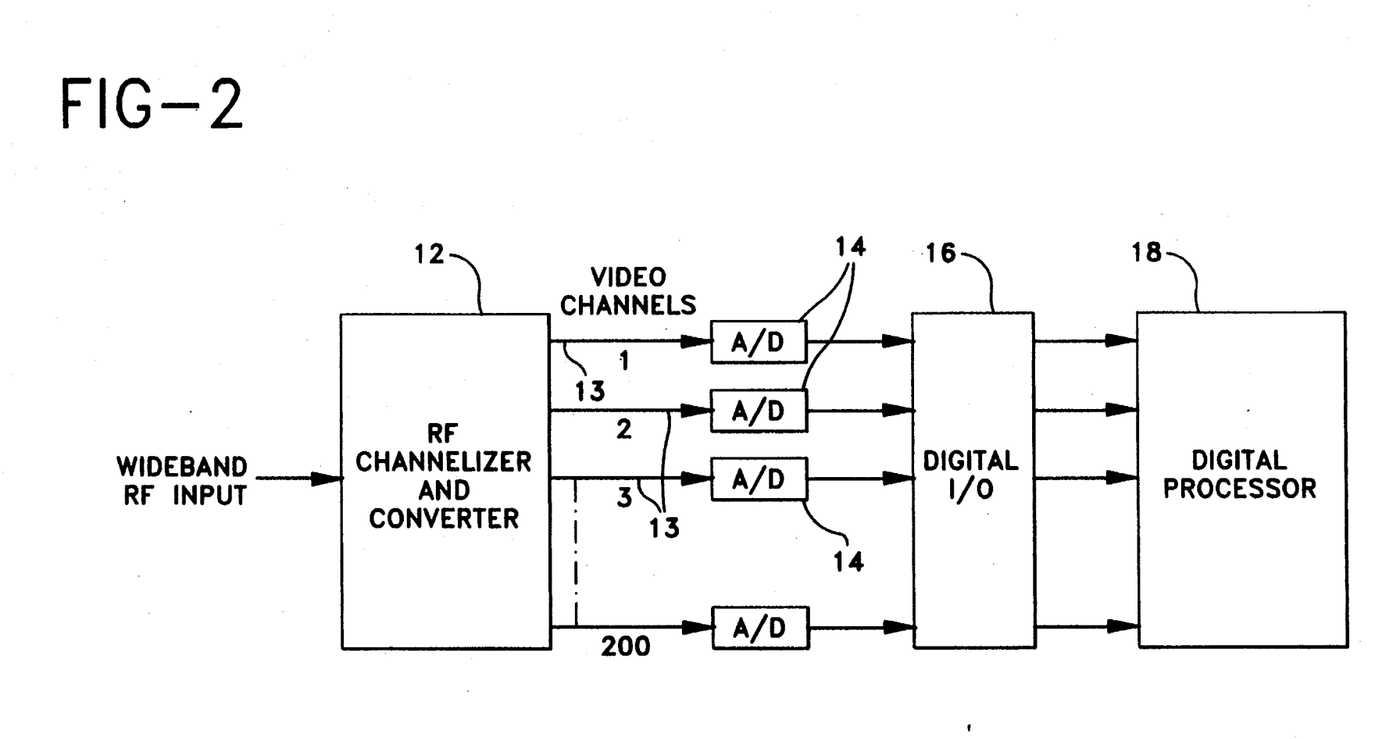
FIG. 2 is a simplified block diagram of a fully digital processor for use with a multichannel receiver.

Comparing the architectures for processing signals using an analog preprocessor approach, preferably using ACT devices, with that of a full digital approach further illustrates the advantages of the analog preprocessor of the present invention. Referring to FIG. 2, in a full digital approach, a system designed for processing the data from a 200 channel receiver 12 would require an A/D converter 14 for each video channel output 13. Thus, an advanced multichannel receiver having 200 video channels would need 200 A/D converters. Additionally, a 200 channel digital input/output (I/O) interface 16 having a corresponding frequency bandwidth in relation to the A/D converters is needed. Also shown in FIG. 2 is a digital processor 18 having 200 inputs coupled to the outputs of the I/O interface 16. The digital processor 18 would need to have significant processing power to be able to process the amount of data being received from the advanced multichannel receiver 12.

Thus, in operation, the advanced multichannel receiver would receive a wideband RF input which is segmented between the output video channels 13 of the receiver. Each video output channel 13 is input into an A/D converter 14 which digitally encodes the signals. The output of the A/D converters is coupled to an input of the I/O interface 16 which permits the digitally encoded data to be fed into the digital processor 18. The digital processor would process the data to provide a received signal output.

Figure 3:
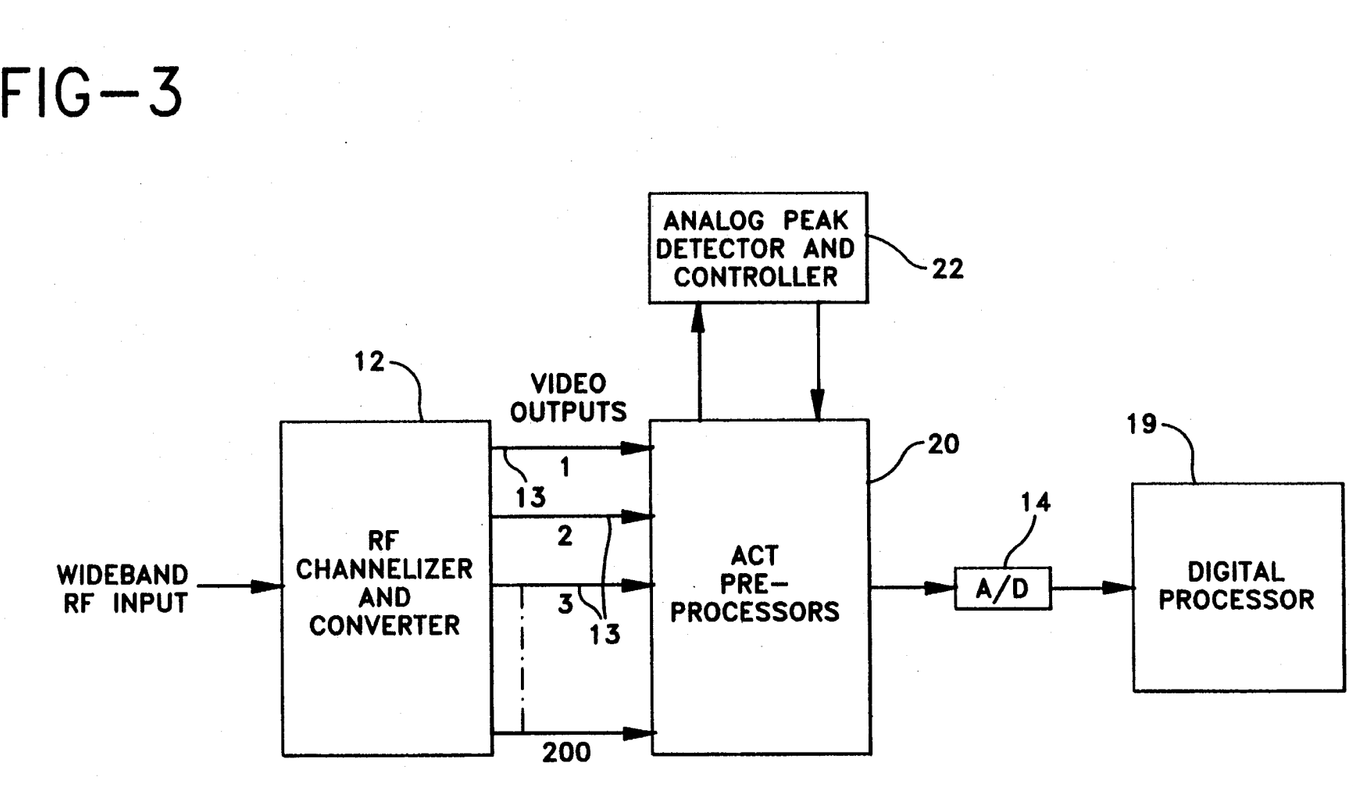
FIG. 3 is a simplified block diagram of an analog preprocessor for use with a multichannel receiver formed in accordance with the present invention.

In contrast, an analog preprocessor architecture using ACT technology, such as formed in accordance with the present invention, is illustrated in FIG. 3. The wideband RF input received by the multichannel receiver is segmented into the video channels of the advanced multichannel receiver by the RF channelizer and converter 12. Each video channel output 13 is input directly into an ACT analog preprocessor 20. Coupled to the ACT analog preprocessors 20 is an analog peak signal detector and controller 22. The analog peak signal detector and controller 22 function to generate and apply an amplitude mask in response to the input analog signals. In the preferred embodiment of the present invention, the ACT device envisioned to be used in the present invention may incorporate an analog peak detector, a "greatest of" circuit (GOF) and a controller directly on an ACT integrated chip. The ACT device 20 and associated controller 22 processes the analog signals using an amplitude mask to eliminate any signal sidelobes and outputs only those valid signals which pass through the amplitude mask. The output signals are input into a single A/D converter 14 which digitally encodes the output signals and whose output is coupled to a digital processor 19. Unlike the digital processor 18 described in relation to FIG. 2, the digital processor 19 used in conjunction with the ACT analog preprocessor architecture as shown in FIG. 3 has a greatly reduced burden and does not require the significant processing power previously described. Using an ACT analog preprocessor 20 can reduce the digital processing requirements of the digital processor 19 by as much as two to three orders of magnitude.

Figure 4A:
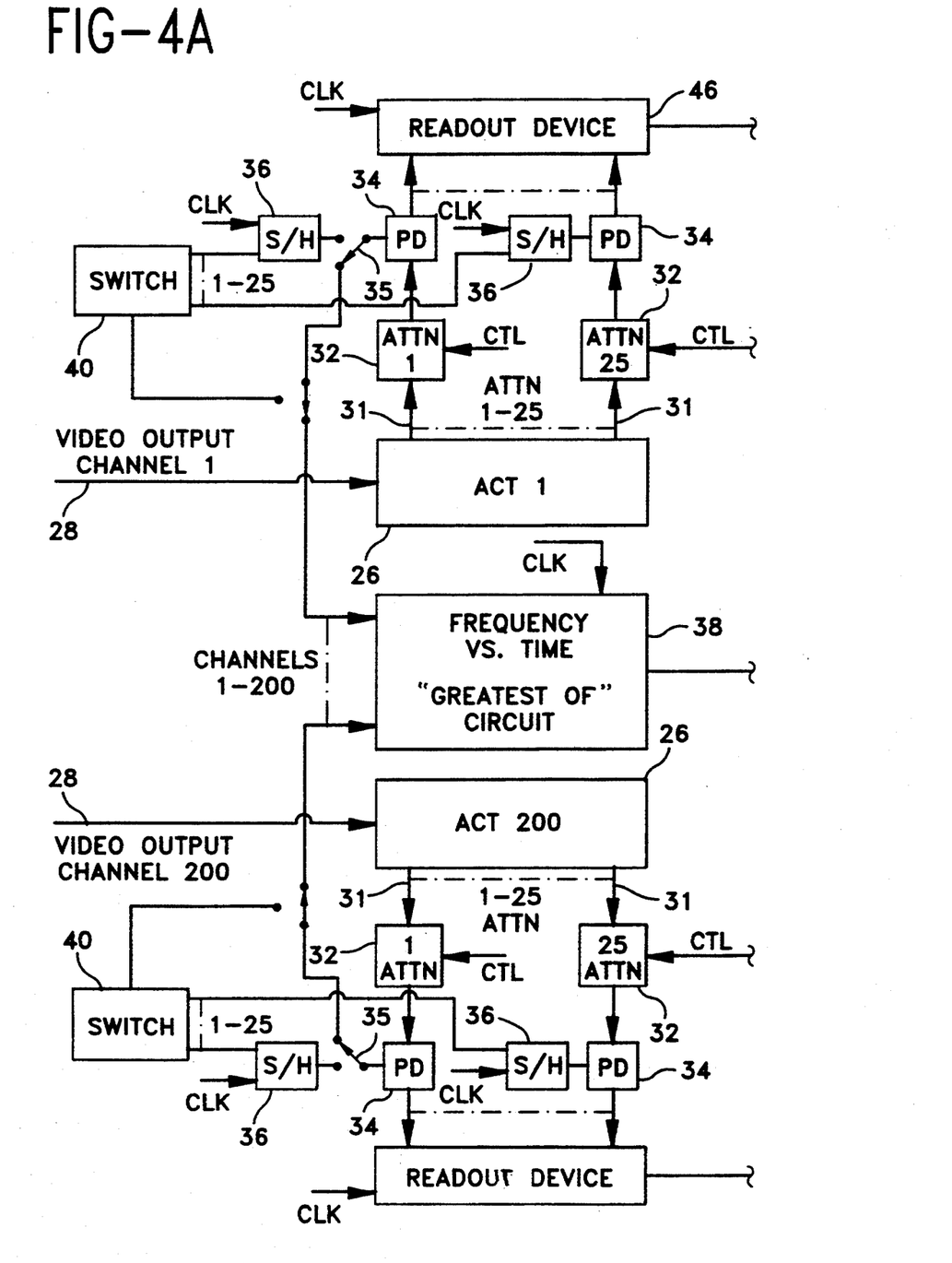
FIGS. 4A and 4B are block diagrams illustrating an analog preprocessor formed in accordance with the present invention.
Figure 4B:
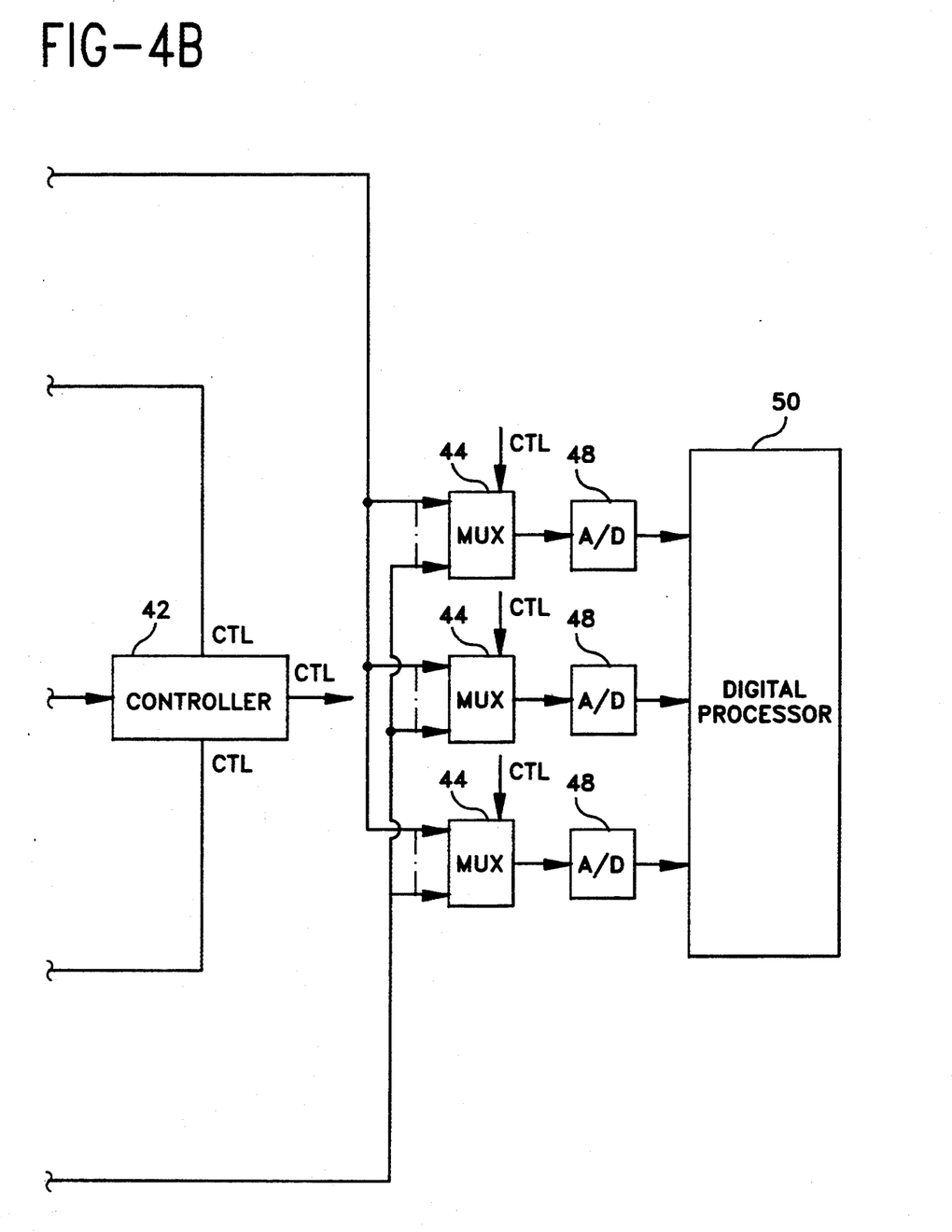

FIGS. 4A and 4B illustrate a simplified block diagram of one embodiment of an analog preprocessor formed in accordance with the present invention. In this simplified block diagram, an ACT device 26 is coupled to each video output channel of the multichannel receiver. Each ACT device preferably includes a set of twenty-five equally spaced taps corresponding to 8 nsec of resolution to read out the amplitude of a signal frame at each 100 nsec interval and define the position of each peak in a 200 nsec interval or signal frame to a ±4 nsec accuracy. In operation, all 200 channels are examined to determine the largest peak signal over time and frequency. In response to the determination of a peak signal, an amplitude mask is applied to a region comprising ±15 channels and ±100 nsec about a peak signal's address (i.e. channel and time slot). In FIG. 4, two video channels are shown in detail, and a complete embodiment would comprise 200 video channels and associated components similar in structure and function to those which are shown in FIG. 4.

The analog preprocessor of the present invention includes an ACT device 26 coupled to each output video channel 28 from the receiver. As previously mentioned, the ACT device 26 preferably includes twenty-five taps 31 wherein each tap corresponds to an 8 nsec time slot within a 200 nsec window or signal frame in the ACT device. Each tap 31 from the ACT device is coupled to the input of a programmable attenuator 32 whose output is coupled to a power divider 34. One output of the power divider 34 is in turn coupled to a readout device 46 while a second output of the power divider 34 is coupled to a sample and hold device (S/H) 36 which holds the signal amplitude and address. The S/H devices 36 are clocked to read out the signal information in the devices and for system synchronization. The output of each S/H device 36 is coupled an input of a switch 40 having an output coupled to the input of a frequency versus time "greatest of" (GOF) circuit 38. The switch 40 reads out the outputs of the S/H devices 36 in sequence into the GOF circuit 38. The switch 40 allows the peak signals stored in the S/H devices corresponding to each tap of the ACT devices 26 to be input into the GOF circuit to determine an overall peak signal for each time slot. The GOF circuit 38 and switch 40 are also clocked for system synchronization.

The output of the GOF circuit 38 is coupled to the controller 42. The controller 42 determines the time slot with the maximum amplitude for each 200 nsec time frame and utilizes the address (channel number and time slot number) of this peak signal to provide a control signal to each programmable attenuator 32 associated with all 200 ACT devices 26. Additionally, the controller 42 provides a control signal to three multiplexer (MUX) switches 44. The MUX switches 44 have their inputs connected to the outputs of the readout device 46 associated with each channel of the receiver.

Each MUX switch 44 has an output coupled to an input of an analog-to-digital converter (A/D) 48 which digitally encodes the analog signals permitted to pass through the analog preprocessor. The outputs of the A/D converters 48 are coupled to a digital processor 50 which performs frequency interpolation and final processing of the signals passing through the analog preprocessor.

The operation of the analog preprocessor eliminates signal sidelobes which may be associated with valid signals and only allows valid signals to pass through the analog preprocessor into the digital processor 50. The method of operation will now be described in detail.

Each video output channel 28 from the multichannel receiver is input into a corresponding ACT device 26. As previously described, each ACT device 26 preferably has twenty-five taps 31. At the start of each 100 nsec time frame, the first tap of each ACT device 26 is coupled through an attenuator 32 and power divider 34 directly to the frequency versus time GOF circuit 38. This is accomplished by setting the corresponding programmable attenuator 32 to zero and bypassing the associated S/H circuit 36 through the use of a switch 35 positioned between the output of the power divider 34 and the input of the S/H circuit 36 associated with the first tap of the ACT device. This operation is done at the first tap for each ACT device 26 so that the GOF circuit 38 can determine the channel having the greatest signal (maximum amplitude signal) for the first 8 nsec time slot. As the remaining time slots are entered into the ACT devices, the GOF circuit 38 receives clocked inputs from the S/H circuits 36 through the switch 40. The GOF circuit 38 is clocked for synchronization and its output is the amplitude value and channel number of the greatest amplitude signal in each 8 nsec time slot which is input into the controller 42. The controller 42 utilizes a peak detection circuit to determine the 8 nsec time slot having the maximum amplitude in the 200 nsec frame and the associated channel number.

Once the channel and time slot having the maximum amplitude signal is determined, the controller 42 sets the programmable attenuators 32 so that the attenuation for the channel having the maximum amplitude signal and two adjacent channels, one on each side of the maximum amplitude channel, is set to zero. The controller 42 sets all other attenuators for those channels other than the three selected channels described above to maximum, thereby effectively eliminating those channels from the window or signal frame being processed.

The signals from the ACT taps 31 for the three selected channels having associated attenuators set at zero are then read into a readout device. More specifically, the signals pass through the attenuator 32 and into a power divider 34 whose output is coupled to the readout device 46. The readout device 46 is preferably a peak detector which samples the voltages of the input signals and determines peak voltages corresponding to peak signals. The peak voltage signals are output from the readout device 46 and input into three MUX switches 44. The MUX switches 44 are clocked for synchronization and controlled by a signal from the controller 42 which tunes the MUX switches 44 so that one MUX switch 44 is associated with the channel having the peak amplitude signal and the remaining two MUX switches 44 are tuned to read the channels adjacent to the peak amplitude signal channel. The tuned MUX switches 44 transmit the data from the readout device 46 for the maximum amplitude signal channel and two adjacent channels into three A/D converters 48 which digitally encode the analog signals for further processing by the receiver's digital processor 50. The digital processor performs a frequency interpolation to more accurately determine the peak signal's frequency.

Following the determination of the maximum amplitude signal, the controller 42 again adjusts the programmable attenuator values. The attenuators 32 are now adjusted in accordance with the desired mask values relative to the peak signal so that attenuators in $\pm 15$ channels and $\pm 8$ time slots from the position of the peak signal are adjusted. The other attenuators remain at maximum value. The controller 42 again initiates a clocked readout of all ACT taps through the attenuators 32, the power dividers 34, the sample and hold circuits 36 and the switch 40 into the frequency versus time GOF circuit 38 and controller 42 to determine the location and readout the next highest peak. Only those signals having an amplitude which exceeds the attenuator levels are used in this process. This process is continued until a predetermined number of peaks are processed or no new peaks are detected.

Each peak amplitude signal determined by the GOF circuit 38 is input to the controller 42. The controller tunes the MUX switches 44 to allow the clocked readout device 46 to provide signals to the MUX switches 44 in response to signals from the taps of the ACT devices 26 which have passed through the amplitude mask. The readout device 46 operates as previously described to provide an output signal corresponding to the peak amplitude channel and time slot and two adjacent channels in the same time slot to the MUX switches 44. These signals pass through the tuned MUX switches and are encoded by the A/D converters 48 coupled to each MUX switch 44. The digitally encoded signals are then finally processed by the digital processor 50 within the multichannel receiver as previously described.

It is envisioned that a plurality of channels may be input into a single ACT device thereby reducing the number of components required to process data from a multichannel receiver. Additionally, the ACT devices and programmable attenuators may be integrated into a semiconductor chip thereby simplifying the architecture and connections for the analog preprocessor formed in accordance with the present invention.

Figure 5A:
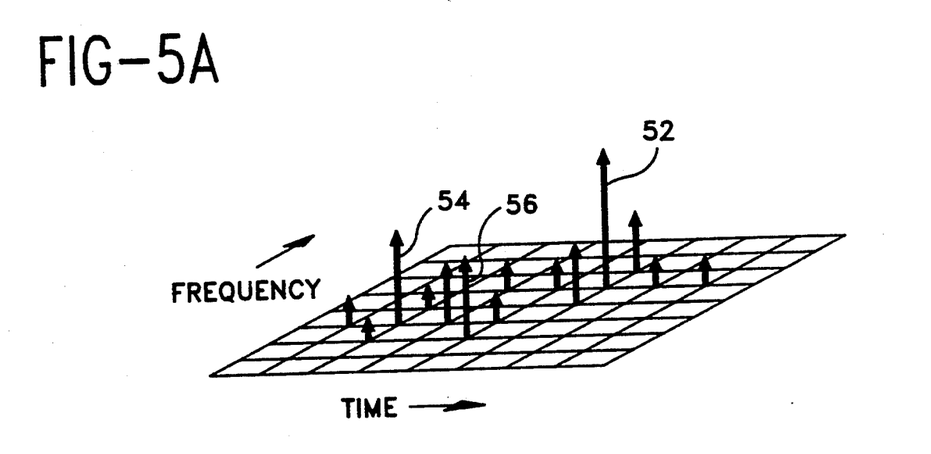
FIG. 5A through 5C are simplified diagrams illustrating three valid signals and an associated amplitude mask formed in accordance with the present invention.
Figure 5B:
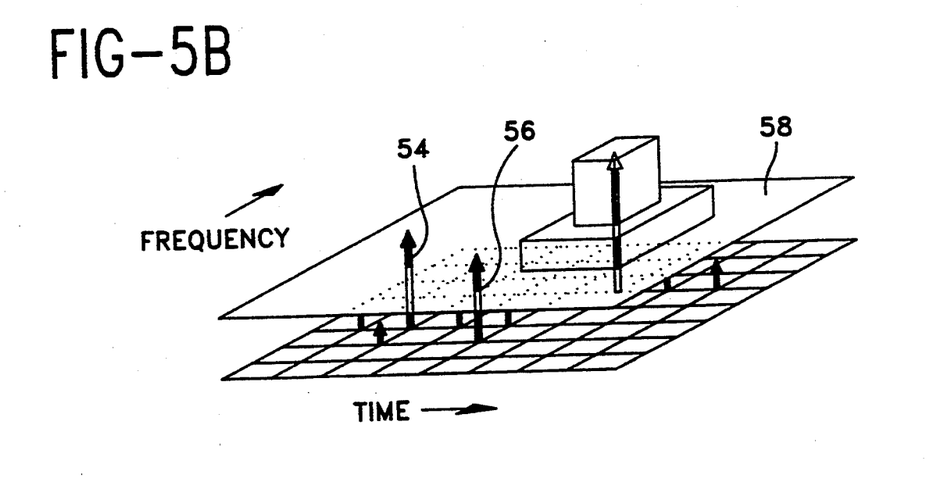
Figure 5C:
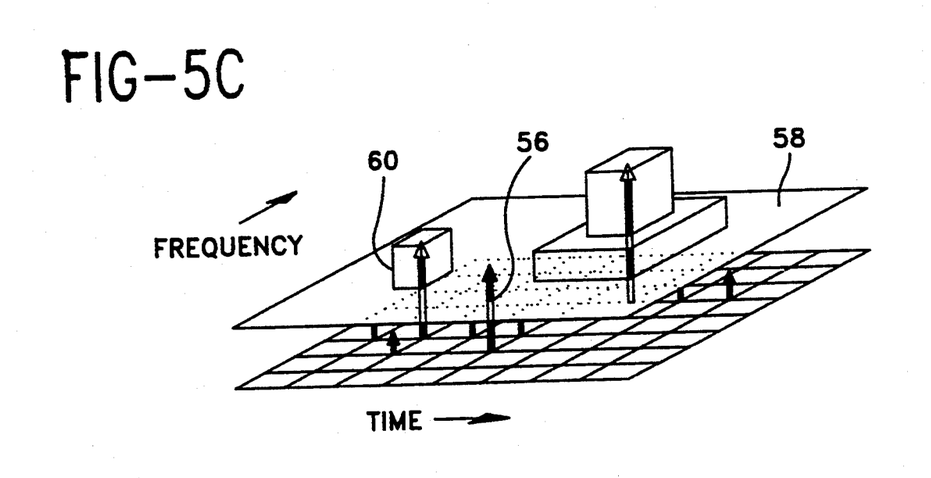

The amplitude mask is discussed further with regard to the figures. Referring to FIGS. 5A–C, three valid signals 52, 54, 56 are illustrated with associated sidelobes on a time versus frequency three-dimensional graph. The valid signals 52, 54, 56 can be extracted from the sidelobes using an amplitude mask which is formed as an adaptive two-dimensional threshold. The threshold level is based on the known two-dimensional system response and updated with the sequential identification of valid signals.

This amplitude mask is illustrated in a highly simplified form in FIGS. 5A through 5C. In the first operation shown in FIG. 5A, the entire signal frame is searched to find the largest valid signal 52. The position of this signal is determined and a threshold amplitude mask 58 having an amplitude derived from the two-dimensional system response is centered on the location of the first valid signal 52. Only those signals having sufficient amplitude to penetrate the mask 58 are subject to subsequent examination. The second largest signal 54 is identified in FIG. 5B, and a new mask component 60 is generated and centered on the location of the second largest signal. This new mask or mask component is added to the evolving mask which is now scaled to the amplitude of the second valid signal 54. The third and final valid signal 56 is the only remaining signal having sufficient amplitude to penetrate the mask as illustrated in FIG. 5C. In the preferred embodiment, the ACT tapped delay lines are used to provide parallel processing for the signal frame search and for initiation and development of the threshold amplitude mask.

Referring back to FIG. 1, three pulsed signals having different amplitudes are shown in one channel of an advanced multichannel receiver. The receiver compresses the signals into narrow pulses having 3 db pulsewidths less than 10 nsec each. Thus, in the time domain, a 3 db amplitude response has an 8 nsec pulsewidth which is used to apply an amplitude mask. The amplitude mask is preferably designed to resolve equal power responses which are separated by 8 nsec. Additionally, in the frequency domain, the analog preprocessor of the present invention is capable of identifying the peak channel for each signal by obtaining adjacent channel differences for frequency accuracy interpolation as previously described with respect to the digital processor 50 in FIG. 4B.

The amplitude mask of the preferred embodiment of the present invention is designed to work with an advanced multichannel receiver such as that described in commonly owned U.S. Pat. No. 4,652,879, to Rudish, et al., the disclosure of which is incorporated herein by reference. Although the receiver disclosed in the Rudish, et al. patent is a multi-dimensional receiver, namely three-dimensional, the analog preprocessor formed in accordance with the present invention can be used in conjunction with any two-dimensional system as well.

Presently known advanced multichannel receivers generally process received signals from the front end through a logarithmic amplifier prior to detection and signal identification to reduce the dynamic range requirements of the detector and post processor. Accordingly, an amplitude mask generated in an analog processor formed in accordance with the present invention, using the inherent advantages of ACT devices, includes the following steps:

1. A predetermined time window or signal frame is input into the analog preprocessor from the multichannel receiver front end.
2. The sample having the largest magnitude in the entire signal frame is identified. This sample is declared to be the first valid signal.
3. An amplitude mask is generated from the first valid signal amplitude and address. The amplitude mask is applied to the data in the signal frame and only those signals having a magnitude greater than the amplitude mask are passed along to the next stage in the analog preprocessor.
4. The magnitude search is now executed on a modified signal frame, i.e., those signals having a magnitude greater than the amplitude mask. The signal having the largest magnitude in the modified signal frame is identified and is declared to be the second valid signal.
5. A new component or new amplitude mask is generated in response to the identification of the second valid signal. The new mask is combined with the current values in the amplitude mask. The new value of the mask sample is the larger of the current value and the new value.
6. Steps 4. and 5. are applied iteratively until the last stage of the preprocessor is reached or the last valid signal is detected.

The above-described amplitude mask was tested using an advanced multichannel receiver output matrix having dimensions of 16 frequency channels (160 MHz) by 16 time samples (a 200 nsec window) to verify the performance of the mask. An initial test case included three valid test signals representing a typical multichannel receiver output. A second test case including four valid test signals was also performed to test the accuracy of the amplitude mask on an inter-cardinal plane of other signals. The ability to resolve the three and four test signals in the two test cases provides a simple but effective test of the amplitude mask of the analog preprocessor formed in accordance with the present invention. The first test case having three signals had a signal location and relative amplitude (in dBr) as shown below:

| No. | Channel No. | Time | Strength |
| --- | --- | --- | --- |
| 1 | 11 | 10 | −5 dBr |
| 2 | 7 | 6 | −10 dBr |
| 3 | 15 | 2 | −38 dBr |

The second test case having four signals had a signal location and relative amplitude as shown below:

| No. | Channel No. | Time | Strength |
| --- | --- | --- | --- |
| 1 | 11 | 10 | −5 dBr |
| 2 | 7 | 6 | −10 dBr |
| 3 | 7 | 10 | −10 dBr |
| 4 | 15 | 2 | −38 dBr |

The analog preprocessor amplitude mask formed in accordance with the present invention successfully eliminated signal sidelobes and detected all of the valid input signals in the two test cases. The signals were detected in the following order for the first test case having three valid signals as follows:

| No. | Actual Channel No. | Actual Time | Measured Channel No. | Measured Time |
|---|---|---|---|---|
| 1 | 11 | 10 | 11 | 10 |
| 2 | 7 | 6 | 7 | 6 |
| 3 | 15 | 2 | 15 | 2 |

The signals for the second case having four valid signals were all detected in the correct order and location as follows:

| No. | Actual Channel No. | Actual Time | Measured Channel No. | Measured Time |
|---|---|---|---|---|
| 1 | 11 | 10 | 11 | 10 |
| 2 | 7 | 6 | 7 | 6 |
| 3 | 7 | 10 | 7 | 10 |
| 4 | 15 | 2 | 15 | 2 |

Thus, the analog preprocessor formed in accordance with the present invention provides an approach to eliminate signal sidelobes from mainlobe responses in a received signal frame of a multichannel receiver which is accurate and can substantially reduce the burden of the digital processor of the receiver. The amplitude mask as described previously in detail has been proven effective for identifying valid signals and eliminating sidelobes which are inherently formed by the RF channelizer and converter associated with advanced multichannel receivers. Additionally, the use of the ACT device provides the advantage of a non-destructive, high speed monolithic GaAs charge transfer device having a multiplicity of taps which provides RF signal delay to allow the analog preprocessor to effectively operate over a defined time period.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An analog preprocessor coupled to a multichannel receiver including a plurality of channels on which are generated output signals corresponding to received signals, wherein the analog preprocessor is responsive to the output signals of the multichannel receiver to eliminate signal sidelobes associated with valid signals and for selectively passing the valid signals received by the multichannel receiver, which comprises:
    means for determining a peak magnitude valid signal from the received signals, the peak signal determining means generating an output signal in response thereto; and
    means for generating an amplitude mask in response to the output signal of the determining means, the received signals being responsive to the amplitude mask generating means, the amplitude mask generating means attenuating received signals having an amplitude which is below a predetermined level based upon the amplitude of the peak signal, and wherein the amplitude mask generating means comprises:
        a controller having an input coupled to the peak magnitude signal determining means and generating control signals in response to the determining means output signal;
        a plurality of acoustic charge transport devices wherein each of said acoustic charge transport devices is coupled to at least one channel of said multichannel receiver and is responsive to the output signals generated by the receiver, each of said acoustic charge transport devices including a plurality of output taps having output signals generated thereon; and
        a plurality of programmable attenuators coupled to a respective tap of the acoustic charge transport devices wherein each of said programmable attenuators is responsive to the output signal generated at a respective tap of the plurality of output taps of said acoustic charge transport devices, each of the programmable attenuators having a first output coupled to the peak determining means, the controller providing control signals to each of said attenuators to adjust the attenuators in response to the determining means output signal thereby generating the amplitude mask.

2. An analog preprocessor as defined by claim 1, wherein the peak signal determining means comprises a circuit means for comparing the received signals to determine a receiver channel having a signal with the greatest amplitude.

3. An analog preprocessor as defined by claim 1, further comprising:
    a power divider coupled between the output of each programmable attenuator and the peak determining means, the power divider having a first and second output and generating output signals thereon, the first output being coupled to the peak determining means;
    a readout device coupled to the second output of said power divider, the readout device having means responsive to the output signal from the second output of the power divider and generating peak voltage signals;
    at least one analog multiplexer switch having means responsive to the peak voltage signals of the readout device;
    an analog-to-digital converter coupled to each analog multiplexer switch, the analog-to-digital converter encoding the peak voltage signals for further processing; and
    a digital processor coupled to the analog-to-digital converter and having means responsive to the encoded peak voltage signals, the digital processor providing a final output signal therefrom.

4. An analog preprocessor coupled to a multichannel receiver including a plurality of channels on which are generated output signals corresponding to received signals, wherein the analog preprocessor is responsive to the output signals of the multichannel receiver to eliminate signal sidelobes associated with valid signals and for selectively passing the valid signals received by the multichannel receiver, which comprises:
    means for determining a first peak valid signal from the received signals during a predetermined time frame, the peak signal determining means generating a peak output signal in response thereto;
    means for generating a first amplitude mask in response to the peak output signal of the determining means, the first amplitude mask having a peak attenuation value substantially equal to the amplitude of the first peak signal, whereby expected sidelobes of the received signals having a magnitude less than the amplitude of the first amplitude mask are eliminated from the received signals in the predetermined time frame;

means for determining a second peak signal from the received signals passing through the amplitude mask, the determining means generating an output signal in response thereto; and means for generating a second amplitude mask in response to the output signal of the second peak signal whereby signals having an amplitude less than the relative amplitude values of the second amplitude mask are eliminated from the received signals in the predetermined time frame and signals having an amplitude exceeding the amplitude of the amplitude mask pass through the analog preprocessor for further processing in the multichannel receiver.

5. An analog preprocessor as defined by claim 4, wherein the first peak signal determining means comprises a circuit means for comparing the received signals to determine a receiver channel having a signal with the greatest amplitude.

6. An analog preprocessor as defined by claim 4, wherein the second peak signal determining means comprises a circuit means for comparing the received signals to determine a receiver channel having a signal with the greatest amplitude.

7. An analog preprocessor as defined by claim 4, wherein the amplitude mask generating means comprises:

a controller having an input coupled to the peak magnitude signal determining means and generating control signals in response to the determining means output signal;

a plurality of acoustic charge transport devices wherein each of said acoustic charge transport devices is coupled to at least one channel of said multichannel receiver and is responsive to the output signals generated by the receiver, each of said acoustic charge transport devices including a plurality of output taps having output signals generated thereon; and a plurality of programmable attenuators coupled to a respective tap of the acoustic charge transport devices wherein each of said programmable attenuators is responsive to the output signal generated at a respective tap of the plurality of output taps of said acoustic charge transport devices, each of the programmable attenuators having a first output coupled to the peak determining means, the controller providing control signals to each of said attenuators to adjust the attenuators in response to the determining means output signal thereby generating the amplitude mask.

8. An analog preprocessor as defined by claim 7, further comprising:

a power divider coupled between the output of each programmable attenuator and the peak determining means, the power divider having a first and second output and generating output signals thereon, the first output being coupled to the peak determining means;

a readout device coupled to the second output of said power divider, the readout device having means responsive to the output signal from the second output of the power divider and generating peak voltage signals;

at least one analog multiplexer switch having means responsive to the peak voltage signals of the readout device;

an analog-to-digital converter coupled to each analog multiplexer switch, the analog-to-digital converter encoding the peak voltage signals for further processing; and a digital processor coupled to the analog-to-digital converter and having means responsive to the encoded peak voltage signals, the digital processor providing a final output signal therefrom.

9. An RF signal receiving system for eliminating signal sidelobes from received signals, which comprises:

a multichannel receiver for receiving RF signals wherein the multichannel receiver includes a plurality of channels on which are generated output signals corresponding to the received signals; and an analog preprocessor having means responsive to the output signals from the channels of the multichannel receiver, which comprises:

a plurality of acoustic charge transport devices, wherein each acoustic charge transport device has an input coupled to at least one of said plurality of channels of the receiver and wherein each acoustic charge transport device includes a plurality of output taps for providing output signals from said acoustic charge transport device;

a plurality of programmable attenuators, each of said attenuators having a first input coupled to each of said plurality of output taps of said acoustic charge transport device;

means for determining a peak amplitude valid signal from the received signals, the determining means generating an output signal in response thereto;

a controller having an input coupled to the peak amplitude signal determining means, the controller providing output control signals to adjust each of said attenuators in response to said output signal from the peak signal determining means, each of said attenuators being adjusted by said controller output signals to form an amplitude mask having a relative amplitude level equal to or below an amplitude of the peak amplitude signal identified by said determining means, whereby received signals having an amplitude less than the amplitude of the amplitude mask are eliminated by attenuation from the received signals and signals having an amplitude exceeding the amplitude of the amplitude mask pass through the attenuators of the preprocessor; and means for processing the signals passing through the amplitude mask, the processing means responsive to the output of the attenuators.

10. An RF signal receiving system as defined by claim 9, wherein the processing means comprises:

at least one analog-to-digital converter coupled to the plurality of attenuators and digitally generating an encoded output signal in response to the signals passing through the amplitude mask; and a digital processor coupled to the analog-to-digital converter, the digital processor being responsive to the encoded output signals from the analog-to-digital converter and providing a final output signal therefrom.

11. An RF signal receiving system as defined by claim 9, further comprising:

a power divider coupled between the output of each programmable attenuator and the peak determining means, the power divider having a first and second output and generating output signals thereon, the first output being coupled to the peak determining means;

a readout device coupled to the second output of said power divider, the readout device having means responsive to the output signal from the second output of the power divider and generating peak voltage signals;

at least one analog multiplexer switch having means responsive to the peak voltage signals of the readout device and generating an output signal in response thereto; and wherein the processing means includes an analog-to-digital converter coupled to each analog multiplexer switch, the analog-to-digital converter generating an encoded output signal in response to the output signal of the multiplexer switch; and a digital processor coupled to the analog-to-digital converter, the digital processor being responsive to the encoded output signals from the analog-to-digital converter and providing a final output signal therefrom.

12. An RF signal receiving system as defined by claim 9, wherein the peak amplitude determining means comprises a circuit means for comparing the received signals to determine a receiver channel having a signal with the greatest amplitude.

13. A method of determining valid signals from received signals by a multichannel receiver, the multichannel receiver including a plurality of channels on which are generated output signals corresponding to the received signals and an analog preprocessor having means responsive to the output signals of the multichannel receiver, the method of operation of the analog preprocessor comprising the steps of:

(a) determining a peak signal from the received signals, the peak signal being identified as a first valid signal having a defined amplitude and channel and time slot address;

(b) generating a first amplitude mask in response to the first valid signal amplitude and channel and time slot address;

(c) applying the amplitude mask to the received signals whereby signals having an amplitude less than the amplitude of the amplitude mask are eliminated;

(d) determining a second peak signal from the signals having an amplitude greater than the amplitude of the amplitude mask and identifying the second peak signal as a second valid signal having a defined amplitude and frequency channel and time slot address;

(e) generating a second amplitude mask from the second valid signal amplitude and frequency channel and time slot address;

(f) combining the first amplitude mask with the second amplitude mask to form a composite amplitude mask; and (g) applying the composite amplitude mask to remaining signals whereby signals having an amplitude less than the amplitude of the composite amplitude mask are eliminated.

* * * * *